(12) United States Patent
Shimoizumi et al.

(10) Patent No.: US 9,172,080 B2
(45) Date of Patent: Oct. 27, 2015

(54) ELECTRODE PRODUCTION SYSTEM

(71) Applicant: JTEKT Corporation, Osaka (JP)

(72) Inventors: Jun Shimoizumi, Kuwana (JP); Koichi Sakai, Kasugai (JP)

(73) Assignee: JTEKT CORPORATION, Osaka-shi (JP)

( * ) Notice: Subject to any disclaimer, the term of this patent is extended or adjusted under 35 U.S.C. 154(b) by 76 days.

(21) Appl. No.: 13/894,759

(22) Filed: May 15, 2013

(65) Prior Publication Data
US 2013/0312238 A1 Nov. 28, 2013

(30) Foreign Application Priority Data
May 22, 2012 (JP) .................. 2012-116702

(51) Int. Cl.
B05C 5/02 (2006.01)
H01M 4/00 (2006.01)
B05C 5/00 (2006.01)
H01M 4/04 (2006.01)

(52) U.S. Cl.
CPC ............... H01M 4/00 (2013.01); B05C 5/001 (2013.01); B05C 5/02 (2013.01); B05C 5/0245 (2013.01); H01M 4/0404 (2013.01); H01M 4/0435 (2013.01); H01M 4/04 (2013.01); H01M 4/043 (2013.01); H01M 4/0407 (2013.01); *Y10T 29/51* (2015.01)

(58) Field of Classification Search
CPC ... H01M 4/04; H01M 4/0404; H01M 4/0407; H01M 4/043; H01M 4/0435; H01M 4/00; Y02E 60/122; B05C 5/001; B05C 5/02; B05C 5/0245; Y10T 29/51

USPC .............. 118/66–68, 419, 429, 304, 600–612
See application file for complete search history.

(56) References Cited

U.S. PATENT DOCUMENTS 4,911,995 A * 3/1990 Belanger et al. .............. 429/312
5,128,177 A * 7/1992 Vecellio ........................ 427/235
5,747,103 A * 5/1998 Mitchell et al. ............... 427/123
(Continued)

FOREIGN PATENT DOCUMENTS

FR         1417500       * 11/1965
JP         2001-338641      12/2001
(Continued)

OTHER PUBLICATIONS

Extended European Search Report issued Jul. 29, 2015 in Patent Application No. 13167984.7.

*Primary Examiner* — Laura Edwards
(74) *Attorney, Agent, or Firm* — Oblon, McClelland, Maier & Neustadt, L.L.P.

(57) ABSTRACT

An electrode production system is configured so that a metal foil is folded back a plurality of times and conveyed by a plurality of rollers that are disposed for a coating device, a drying device and a pressing device. A coating process, a drying process and a pressing process are serially performed by the coating device, the drying device and the pressing device, respectively, by using the rollers. This makes it possible to unwind the rolled metal foil and convey the metal foil in the up-and-down direction. The coating device, the drying device and the pressing device can be integrated and thus the size of the electrode production system can be reduced. Furthermore, since a small-size electrode production system can be configured, it is easy to install the electrode production system in a clean and dry environment.

10 Claims, 6 Drawing Sheets

(56) References Cited

U.S. PATENT DOCUMENTS

| | | |
|---|---|---|
| 6,314,638 B1 * | 11/2001 | Kaido et al. ............... 29/730 |
| 2006/0216426 A1 * | 9/2006 | Brown ...................... 427/421.1 |
| 2010/0075023 A1 * | 3/2010 | Emoto et al. ............... 427/58 |

FOREIGN PATENT DOCUMENTS

| | | |
|---|---|---|
| JP | 2010-67507 | 3/2010 |
| JP | 2010-73559 | 4/2010 |
| WO | WO 2011/145556 A1 | 11/2011 |

* cited by examiner

ELECTRODE PRODUCTION SYSTEM

INCORPORATION BY REFERENCE/RELATED APPLICATION

This application claims priority to Japanese Patent Application No. 2012-116702 filed on May 22, 2012 the disclosure of which, including the specification, drawings and abstract, is incorporated herein by reference in its entirety.

BACKGROUND OF THE INVENTION

1. Field of the Invention

The invention relates to a system that produces an electrode for use in a battery.

2. Discussion of Background

Batteries, such as lithium-ion secondary batteries, are widely used as electric power supplies for driving or activating electric vehicles, electronic appliances, and the like. A system that produces an electrode for use in such a battery (an electrode production apparatus or an electrode production method) is described in, for example, Japanese Patent Application Publication No. 2010-67507 (JP 2010-67507 A). An electrode production system described in this publication is generally configured to include a kneading device (kneading process) that kneads an electrode material and a solvent, a coating device (coating process) that coats a metal foil with the kneaded electrode material containing the solvent, a drying device (drying process) that dries the solvent-containing electrode material with which the metal foil is coated, and a pressing device (pressing process) that presses the dried electrode material. In the electrode production system configured in this manner, the metal foil in the form of a roll is unwound from the roll and conveyed in a horizontal direction, and then the coating process is performed by the coating device, the drying process is performed by the drying device and the pressing process is performed by the pressing device.

In general, a drying device in a conventional electrode production system has a production line that is as long as several ten meters because the drying device performs drying by using hot air and therefore the drying process is a time-consuming process. Therefore, the electrode production system is divided into devices, that is, the electrode production system is configured to include a kneading device, a coating and drying device, and a pressing device. Since an electrode material for a positive electrode and an electrode material for a negative electrode are required for producing a battery, a positive-electrode production system and a negative-electrode production system are separately provided. Furthermore, the electrode production system needs to be installed in a clean and dry environment in order to prevent impurities, such as dust, dirt, and moisture, from being mixed into the electrode material during a production process. Hence, the conventional electrode production system is large in size and high in cost.

SUMMARY OF THE INVENTION

The invention provides an electrode production system that is small in size and low in cost.

According to a feature of an example of the invention, there is provided an electrode production system that produces an electrode of a battery, and that includes: a coating device which coats a surface of a metal foil, which is unwound from a roll of the wound metal foil and conveyed, with an electrode material containing a solvent so that the electrode material containing the solvent adheres to the surface of the metal foil; a drying device that dries the electrode material containing the solvent and adhering to the surface of the conveyed metal foil so that the electrode material is fixed to the surface of the conveyed metal foil; and a pressing device that presses the electrode material fixed to the surface of the conveyed metal foil, wherein the coating device, the drying device and the pressing device are provided with a plurality of rollers by which the metal foil is folded back a plurality of times and conveyed; and the coating device, the drying device and the pressing device are arranged so that processes are serially performed by the coating device, the drying device and the pressing device by using the rollers.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

An electrode production system is a system that produces an electrode for use in a battery by kneading an electrode material and a solvent, coating a surface of a metal foil with the electrode material that contains the solvent, and drying and pressing the coating. Examples of the metal foil used for a positive/negative electrode for a lithium-ion secondary battery include an aluminum foil and a copper foil. Examples of the electrode material for a positive electrode of a lithium-ion secondary battery include lithium manganate and acetylene black. Examples of the electrode material for a negative electrode of a lithium-ion secondary battery include graphite and acetylene black. Furthermore, examples of the solvent used for the positive/negative electrode include ethylene carbonate. Hereinafter, a general configuration of an electrode production system in accordance with an embodiment of the invention will be described with reference to FIG. 1A, FIG. 1B and FIG. 2.

Figure 1A:
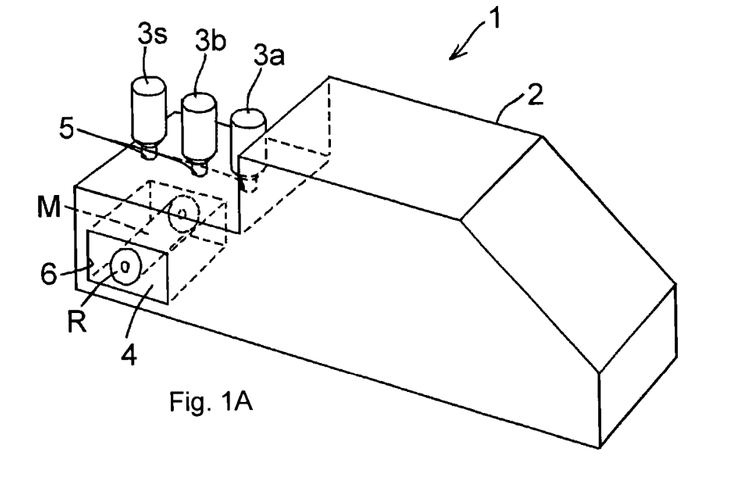
FIG. 1A is a perspective view showing a general configuration of an electrode production system in accordance with an embodiment of the invention.
Figure 1B:
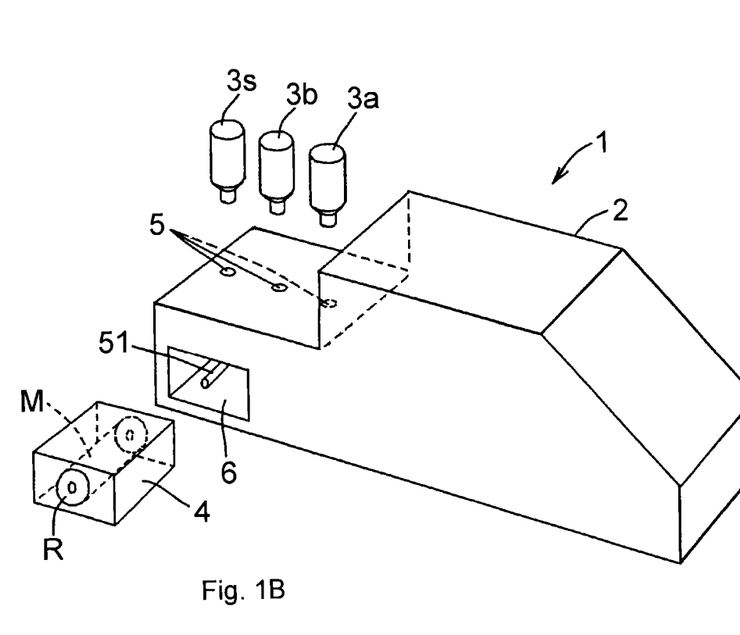
FIG. 1B is a perspective view showing a state of the electrode production system shown in FIG. 1A, in which a cartridge and a cassette have been detached.
Figure 2:
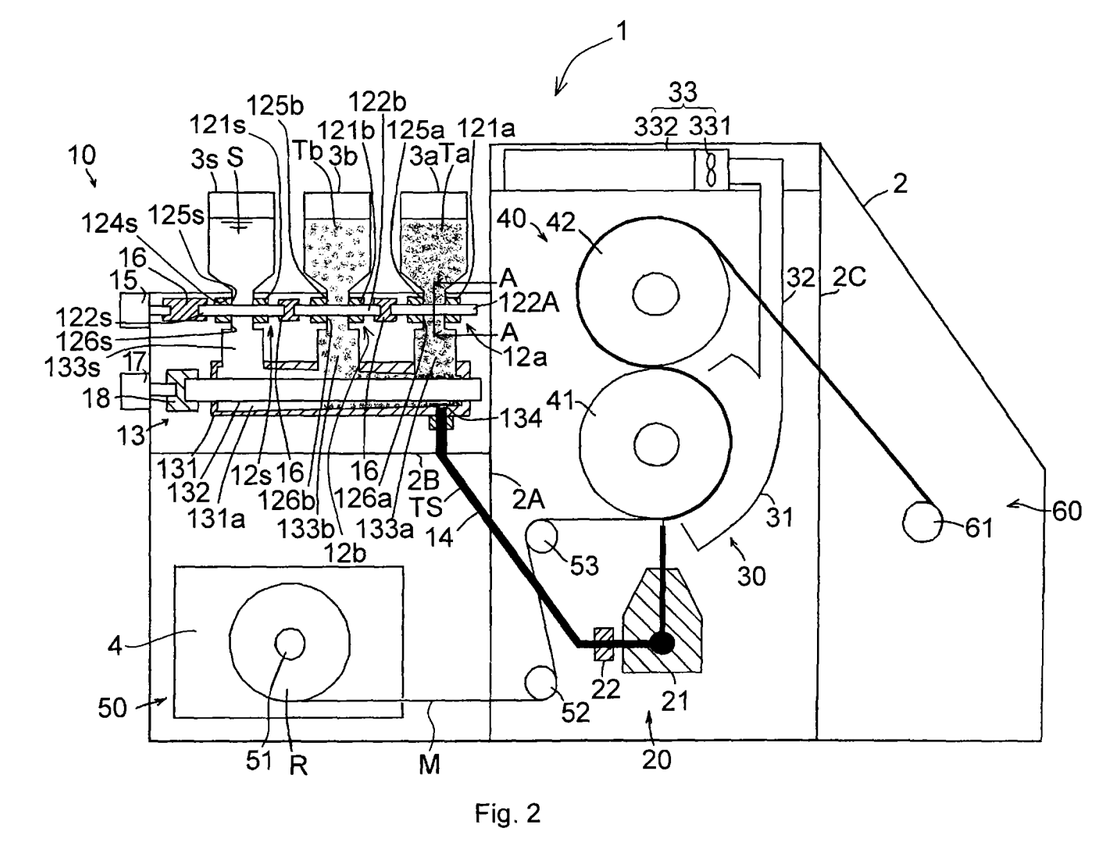
FIG. 2 is a longitudinal sectional view showing an internal configuration of the electrode production system.

As shown in FIGS. 1A, 1B and 2, an electrode production system 1 is a system that produces an electrode that is one of a positive electrode and a negative electrode for use in a battery and that has an electrode material provided on one of two surfaces of a metal foil. This electrode production system 1 is entirely covered by a cover 2. Inside the cover 2, there are provided a kneading device 10, a coating device 20, a drying device 30, a pressing device 40, an unwinding device 50, a winding device 60, and the like. In order to make it possible to keep the area inside the cover 2 in a cleaned state free from dirt, dust, or the like, and in an air-conditioned state in which a predetermined temperature and a predetermined humidity are maintained, there are provided an air-cleaning device and an air-conditioning device.

Figure 3:
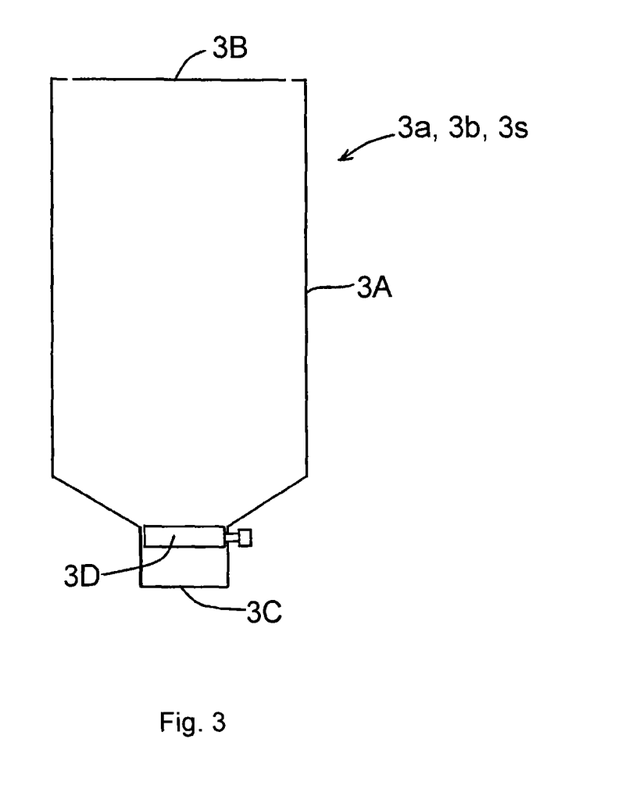
FIG. 3 is a longitudinal sectional view showing an example of the cartridge.

In this electrode production system 1, electrode materials Ta and Tb and a solvent S are contained in cartridges 3a, 3b and 3s, respectively, and are supplied therefrom, and a metal foil M is contained in a cassette 4 and is supplied therefrom. As shown in FIG. 3, in each of the cartridges 3a, 3b and 3s, an inlet opening 3B for the content is provided at an upper portion of a main body 3A with a hollow cylindrical shape, and a discharge opening 3C for the content is provided at a lower portion of the main body 3A. A valve 3D that opens and closes the discharge opening 3C is provided near the discharge opening 3C. The cartridges 3a and 3b contain two different kinds of electrode materials Ta and Tb in the form of powder, respectively, and the cartridge 3s contains the solvent S in the form of liquid. The cassette 4 has a box shape. A roll R of the metal foil M wound is rotatably supported inside the cassette 4.

In a rear upper portion of the cover 2 (a left upper portion of the cover 2 in FIG. 1A), there are provided cartridge fitting portions 5 to which the cartridges 3a, 3b and 3s are detachably fitted. Each cartridge fitting portion 5 is provided with a valve (not shown) that opens and closes the cartridge fitting portion 5. The kneading device 10 is disposed at a location inside the cover 2, the location being below the cartridge fitting portions 5. Furthermore, a cassette fitting portion 6 is provided at a location inside the cover 2, the location being below the kneading device 10. The cassette 4 is detachably fitted to the cassette fitting portion 6 from a side surface of the cover 2. The unwinding device 50 is disposed in the cassette fitting portion 6. The unwinding device 50 includes a holder member (not shown) that holds the cassette 4, and a shaft member 51 that is inserted in the roll R of the metal foil M disposed in the cassette 4 and that is provided with a motor (not shown) that rotates the roll R.

Furthermore, the winding device 60 is disposed inside a front portion of the cover 2 (a right side portion of the cover 2 in FIG. 1A). The winding device 60 includes a shaft member 61 that is inserted in a roll R and that is provided with a motor (not shown) that rotates the roll R to wind up the metal foil M having thereon the electrode materials Ta and Tb. Inside the cover 2, the coating device 20, the drying device 30 and the pressing device 40 are disposed between the unwinding device 50 and the winding device 60. Inside the cover 2, there are provided partition walls 2A, 2B and 2C that separate a portion that covers the coating device 20, the drying device 30 and the pressing device 40, a portion that covers the kneading device 10, a portion that covers the unwinding device 50, and a portion that covers the winding device 60, from each other.

The coating device 20, the drying device 30 and the pressing device 40 are provided with a plurality of rollers 52, 53, 41, 42 by which the metal foil M is bent (folded back) a plurality of times and conveyed. The coating device 20, the drying device 30 and the pressing device 40 are arranged so that processes can be serially performed by the coating device 20, the drying device 30 and the pressing device 40 by using the rollers 52, 53, 41 and 42. The rollers 52 and 53 are disposed in an up-and-down direction between the unwinding device 50 and the coating device 20. The rollers 52 and 53 are conveyor rollers that change the conveyance direction of the metal foil M unwound by the unwinding device 50 into a conveyance direction toward the coating device 20. Furthermore, although details will be described later, the rollers 41 and 42 are a pair of a first roller 41 and a second roller 42. The first roller 41 and the second roller 42 are disposed with a predetermined gap therebetween in the up-and-down direction, above a die coater 21 of the coating device 20. In this embodiment, the coating process and the drying process are performed on the first roller 41, and the pressing process is performed on the second roller 42.

The kneading device 10 is a device that kneads the electrode materials Ta and Tb and the solvent S taken from the cartridges 3a, 3b and 3s. The kneading device 10 includes: fixed-amount discharge devices 12a, 12b and 12s which are disposed below the cartridge fitting portions 5 and each of which discharges a fixed amount of a corresponding one of the electrode materials Ta and Tb and the solvent S contained in the cartridges 3a, 3b and 3s; a kneading extrusion device 13 that is disposed below the fixed-amount discharge devices 12a, 12b and 12s and that kneads the electrode materials Ta and Tb and the solvent S each of which is discharged in the fixed amount; and a supply passage 14 that is disposed below the kneading extrusion device 13 and that supplies a kneaded mixture of the electrode materials Ta and Tb and the solvent S (hereinafter, referred to as "kneaded material TS") to the coating device 20.

Figure 4:
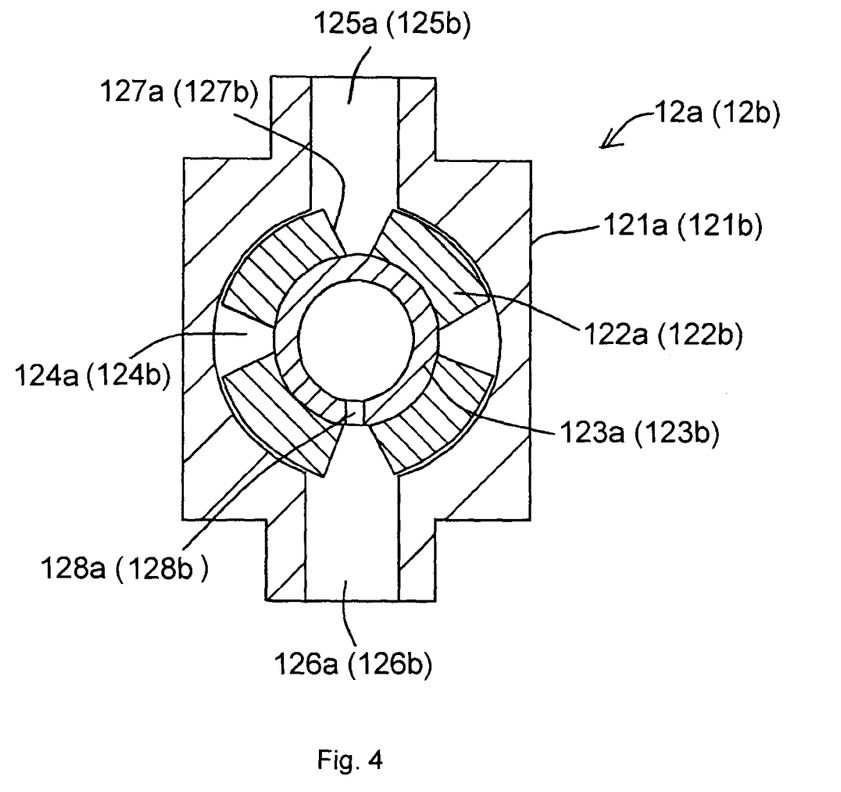
FIG. 4 is a sectional view taken along line A-A of FIG. 2, and shows an internal configuration of a fixed-amount discharge device.

Each of the fixed-amount discharge devices 12a and 12b discharges a fixed amount of a corresponding one of the electrode materials Ta and Tb in the form of powder. As shown in FIG. 4, the fixed-amount discharge devices 12a and 12b include main bodies 121a, 121b, rotary blades 122a, 122b, and air pipes 123a, 123b, respectively.

In the main bodies 121a, 121b, cylindrical spaces 124a, 124b, powder feed openings 125a, 125b and powder discharge openings 126a, 126b are provided, respectively. In the cylindrical spaces 124a, 124b, the rotary blades 122a, 122b and the air pipes 123a, 123b are provided, respectively. The powder feed openings 125a, 125b are provided above the cylindrical spaces 124a, 124b, respectively, and communicate with the cylindrical spaces 124a, 124b. The power discharge openings 126a, 126b are provided below the cylindrical spaces 124a, 124b, respectively, and communicate with the cylindrical spaces 124a, 124b, respectively. The powder feed openings 125a and 125b communicate with the corresponding cartridge fitting portions 5, and the powder discharge openings 126a and 126b communicate with a main body 131 (described later) of the kneading extrusion device 13.

The rotary blades 122a, 122b are provided with a plurality of pockets (four pockets in this example) 127a, 127b, respectively. The pockets 127a are disposed in a circumferential direction, and the pockets 127b are disposed in the circumferential direction. The pockets 127a, 127b store fixed amounts of the electrode materials Ta, Tb supplied from the powder feed openings 125a, 125b, respectively. The rotary blades 122a, 122b are rotatably disposed in the spaces 124a, 124b of the main bodies 121a, 121b, respectively.

A compressed air supply source (not shown) is connected to the air pipes 123a, 123b. The air pipes 123a, 123b are provided with jet holes 128a, 128b, respectively. The jet holes 128a, 128b are formed to extend toward the powder discharge openings 126a, 126b, respectively, and jet the compressed air fed through the pipes toward the powder discharge openings 126a, 126b, respectively. The air pipes 123a, 123b are fixed and disposed so as to function also as rotation shafts of the rotary blades 122a, 122b, respectively.

The fixed-amount discharge device 12s is a device that discharges a fixed amount of the solvent S in the form of liquid. The fixed-amount discharge device 12s is, for example, a known screw pump. In a main body 121s of the fixed-amount discharge device 12s, a cylindrical space 124s, a liquid feed opening 125s, and a liquid discharge opening 126s are provided. In the cylindrical space 124s, a screw 122s is rotatably disposed. The liquid feed opening 125s is provided above the cylindrical space 124s, and communicates with the cylindrical space 124s. The liquid discharge opening 126s is provided below the cylindrical space 124s, and communicates with the space 124s. The liquid feed opening 125s communicates with a corresponding one of the cartridge fitting portions 5, and the liquid discharge opening 126s communicates with the main body 131 (described later) of the kneading extrusion device 13.

The rotary blades 122a and 122b of the fixed-amount discharge devices 12a and 12b, the screw 122s of the fixed-amount discharge device 12s, and a motor shaft of a motor 15 that rotates the rotary blades 122a and 122b and the screw 122s are connected together via joints 16.

The kneading extrusion device 13 is a device that kneads the electrode materials Ta and Tb and the solvent S supplied from the fixed-amount discharge devices 12a, 12b and 12s. The kneading extrusion device 13 includes the main body 131 and a screw 132. In the main body 131, a space 131a, powder feed openings 133a, 133b, a liquid feed opening 133s, and a kneaded material discharge opening 134 are provided. In the space 131a, the screw 132 is disposed. The powder feed openings 133a, 133b and the liquid feed opening 133s are provided above the space 131a, and communicate with the powder discharge openings 126a, 126b and the liquid discharge opening 126s of the fixed-amount discharge devices 12a, 12b and 12s, respectively. The kneaded material discharge opening 134 is provided at a lower portion of an end of the space 131a, and communicates with the supply passage 14 (described later).

The space 131a of the main body 131 has a taper shape that becomes narrower toward the kneaded material discharge opening 134. The screw 132 is rotatably disposed in the space 131a of the main body 131. The screw 132 is configured to be capable of kneading and extruding the kneaded material TS in the direction from the fixed-amount discharge device 12s through the fixed-amount discharge device 12b to the fixed-amount discharge device 12a. The screw 132 and a motor shaft of a motor 17 that rotates the screw 132 are connected to each other via a joint 18.

The supply passage 14 has a tubular shape. An end of the supply passage 14 is connected to the kneaded material discharge opening 134 of the kneading extrusion device 13, and another end of the supply passage 14 is connected to the die coater 21 of the coating device 20. The supply passage 14 is arranged so that the kneaded material TS kneaded by the kneading extrusion device 13 can be supplied to the coating device 20 mainly by extrusion force generated by the kneading extrusion device 13.

The coating device 20 is a device that coats one surface of the metal foil M, which is unwound from the roll R of the wound metal foil M and conveyed, with the kneaded material TS so that the kneaded material TS adheres to the one surface of the metal foil M. This coating device 20 includes the first roller 41 on which the metal foil M is wound and conveyed, the die coater 21 that is disposed below the first roller 41 and that coats the surface of the metal foil M with the kneaded material TS, and a valve 22 that is provided for the die coater 21 and that adjusts the amount of the kneaded material TS supplied to the die coater 21.

The first roller 41 is rotatably supported by bearings (not shown), and is configured to be rotated anticlockwise by a motor and a gear mechanism (which are not shown). The first roller 41 is a roller on which the metal foil M conveyed from the unwinding device 50 via the conveyor rollers 52 and 53 is wound and conveyed, and which supports the metal foil M at a predetermined coating position P in a range where the metal foil M is wound on the first roller 41. The die coater 21 is a known device. In the die coater 21, the kneaded material TS is supplied to a slot orifice (die) and the kneaded material TS is pressurized in the slot orifice so as to directly coat the metal foil M, which is supported by the first roller 41, with the kneaded material TS. The valve 22 is a known device, and is provided on the supply passage 14 in the vicinity of the die coater 21.

The drying device 30 is a device that dries the kneaded material TS adhering to the one surface of the conveyed metal foil M so that the electrode materials Ta and Tb are fixed. The drying device 30 includes the first roller 41 on which the metal foil M with the kneaded material TS adhering thereto is wound and conveyed, a hood 31 that covers the range where the metal foil M is wound on the first roller 41, a duct 32 which communicates with a space inside the hood 31 and through which vapor of the solvent S emitted from the kneaded material TS flows, and an emission recovery device 33 that is connected to the duct 32 and that discharges and recovers vapor of the solvent S.

The first roller 41 is heated by a heat source. As the heat source, for example, an electrically-heated wire, or a pipe, through which a high-temperature liquid passes, is provided in the first roller 41. The metal foil M conveyed from the unwinding device 50 via the conveyor rollers 52 and 53 is wound on the first roller 41, and thus, the first roller 41 contacts and heats the metal foil M. Accordingly, the solvent S contained in the kneaded material TS adhering to the one surface of the metal foil M is vaporized and thus the kneaded material TS is dried. The hood 31 is disposed to cover the range where the metal foil M is wound on the first roller 41 so that the hood 31 can collect vapor of the solvent S emitted from the kneaded material TS adhering to the one surface of the metal foil M. The duct 32 is disposed so as to provide communication from the hood 31 to the emission recovery device 33. The emission recovery device 33 is a known device. The emission recovery device 33 includes an emission fan 331 and an emission recovery portion 332, and is disposed at an upper portion of a middle portion of the cover 2.

The pressing device 40 presses the electrode materials Ta and Tb fixed to the one surface of the conveyed metal foil M so as to achieve a uniform thickness and a uniform density. The pressing device 40 includes the first roller 41 and the second roller 42 that are disposed such that the shafts of the first roller 41 and the second roller 42 are parallel to each other, and there is a predetermined gap between the peripheral surfaces of the first roller 41 and the second roller 42.

The second roller 42 is rotatably supported by bearings (not shown), and is configured to be rotated in the clockwise direction, which is the opposite direction to the rotating direction of the first roller 41, by the motor that also rotates the first roller 41 and a gear mechanism (not shown). The metal foil M with the electrode materials Ta and Tb fixed thereon is wound on the first roller 41, and the first roller 41 conveys the metal foil M into the gap between the first roller 41 and the second roller 42. The metal foil M with the electrode materials Ta and Tb fixed thereon is inserted in the gap between the two rollers to press the electrode materials Ta and Tb. The second roller 42 conveys the metal foil M with the pressed electrode materials Ta and Tb fixed thereon, from the gap between the first roller 41 and the second roller 42.

Operations of the electrode production system will be described. Firstly, as a preparatory process, an operator fits the cartridges 3a, 3b and 3s containing the electrode materials Ta and Tb and the solvent S, respectively, to the corresponding cartridge fitting portions 5, and opens the valve 3D of each of the cartridges 3a, 3b and 3s to open the discharge opening 3C. Furthermore, the cassette 4 in which the metal foil M is housed is attached to the cassette fitting portion 6, and is thus set in the unwinding device 50. Then, the roll R is set in the winding device 60. Then, the electrode production system 1 is started.

As a result, the air cleaner device and the air conditioner device of the electrode production system 1 are activated to keep the area inside the cover 2 in a cleaned state free from dirt, dust, or the like, and an air-conditioned state in which a predetermined temperature and a predetermined humidity are maintained. Then, in the electrode production system 1, the metal foil M is unwound from the cassette 4, and the metal foil M is wound on the first roller 41 and the second roller 42 via the conveyor rollers 52 and 53, and a leading end portion of the metal foil M is fitted to the roll R set in the winding device 60. Then, the unwinding device 50, the winding device 60 and the first and second rollers 41 and 42 are driven to start conveying the metal foil M. In addition, the heat source of the first roller 41 is turned on to heat the first roller 41, and the emission fan 331 of the emission recovery device 33 is driven.

Next, as a kneading process, in the electrode production system 1, the valves of the cartridge fitting portions 5 are opened to open the cartridge fitting portions 5, and thus the electrode materials Ta and Tb and the solvent S are supplied to the fixed-amount discharge devices 12a, 12b and 12s, respectively. At this time, the electrode materials Ta and Tb supplied from the powder feed openings 125a and 125b reach the rotary blades 122a and 122b, and portions of the electrode materials Ta and Tb are charged into the pockets 127a and 127b that face upward. The solvent S supplied from the liquid feed opening 125s reaches the screw 122s.

Then, in the electrode production system 1, the motor 15 for the fixed-amount discharge devices 12a, 12b and 12s is driven to rotate the rotary blades 122a and 122b and the screw 122s. When the pockets 127a and 127b filled with the electrode materials Ta and Tb face downward as the rotary blades 122a and 122b rotate, compressed air is jetted to the powder discharge openings 126a and 126b from the air pipes 123a and 123b through the jet holes 128a and 128b. Accordingly, the fixed amounts of the electrode materials Ta and Tb charged in the pockets 127a and 127b are supplied to the kneading extrusion device 13 through the powder discharge openings 126a and 126b. Furthermore, the fixed amount of solvent S measured by rotation of the screw 122s is supplied to the kneading extrusion device 13 through the liquid discharge opening 126s.

Then, in the electrode production system 1, the motor 17 for the kneading extrusion device 13 is driven to rotate the screw 132. Accordingly, in the space 131a of the main body 131, the solvent S is extruded toward the kneaded material discharge opening 134, and the electrode material Tb is extruded toward the kneaded material discharge opening 134 while being kneaded with the solvent S, and the electrode material Ta is kneaded with the electrode material Tb and the solvent S. Then, the kneaded material TS is supplied from the kneaded material discharge opening 134 to the coating device 20 through the supply passage 14.

Next, as a coating process, in the electrode production system 1, the valve 22 of the coating device 20 is opened to adjust the amount of the kneaded material TS supplied, and the kneaded material TS is supplied to the slot orifice of the die coater 21, and then one surface of the metal foil M supported by the first roller 41 is directly coated with the kneaded material TS. At this time, the metal foil M is conveyed on the first roller 41 at a constant speed, and the kneaded material TS is discharged from the die coater 21 at a constant rate. Therefore, the kneaded material TS can be uniformly applied to the one surface of the metal foil M.

Next, as a drying process, in the electrode production system 1, the metal foil M with the kneaded material TS adhering thereto is conveyed while the metal foil M is in contact with the first roller 41. Accordingly, heat is conducted from the heated first roller 41 to the metal foil M. Therefore, the kneaded material TS adhering to the one surface of the metal foil M can be efficiently dried and the electrode materials Ta and Tb can be fixed to the one surface of the metal foil M. Then, vapor of the solvent S emitted from the kneaded material TS is collected by the hood 31, and is discharged to the emission recovery device 33 through the duct 32 and is thus recovered. Therefore, leakage of vapor of the solvent S to the outside of the system can be prevented.

Next, as a pressing process, in the electrode production system 1, the metal foil M with the electrode materials Ta and Tb fixed thereon is conveyed and inserted into the gap between the first roller 41 and the second roller 42, and the electrode materials Ta and Tb are pressed. Thus, the thickness and density of the electrode materials Ta and Tb can be made uniform. The above-described processes are continuously performed. After production of the electrode with a predetermined length is completed, the operator stops the system, and takes out the roll R of the wound electrode from the winding device 60 to convey it to a subsequent process.

Operation and effects of the electrode production system will be described. The electrode production system 1 is configured so that the metal foil M is folded back a plurality of times and conveyed by the first roller 41, the second roller 42 and the conveyor rollers 52 and 53 that are disposed in the coating device 20, the drying device 30 and the pressing device 40. The processes are serially performed by the devices 20, 30 and 40 by using the first roller 41 and the second roller 42. Thus, unlike the conventional case, it is not necessary to unwind the rolled metal foil M and convey the unwound metal foil M only in a horizontal direction, and it is possible to unwind and convey the metal foil M in the up-and-down direction as well. Therefore, it is easy to ensure a sufficient conveyance distance for the metal foil M. Therefore, unlike the conventional case, a long and large-scale conveyor line is not necessary, and the devices 20, 30 and 40 can be integrated and thus the size of the system can be reduced. Besides, since the electrode production system 1 can be configured in a small size, it is easy to install the system 1 in a clean and dry environment. Hence, the cost of the electrode production system 1 can be reduced.

Furthermore, the electrode production system 1 has the configuration in which the devices 20, 30 and 40 are arranged in the up-and-down direction. This configuration makes it possible to considerably reduce the size of the electrode production system 1 in comparison with a planar arrangement of the devices in the conventional case. Furthermore, the electrode production system 1 is configured so that the processes are performed by the devices 20, 30 and 40 while the metal foil M is in contact with the first roller 41. Thus, it is possible to dry the kneaded material TS adhering to the metal foil M by heating the first roller 41. Therefore, the drying time can be considerably reduced in comparison with the conventional case in which drying is performed by using hot air.

Furthermore, the electrode production system 1 is configured so that the processes are performed on the pair of the first roller 41 and the second roller 42 by the devices 20, 30 and 40. In this embodiment, the first roller 41 is used for all the processes performed by the devices 20, 30 and 40. Thus, the space required for the electrode production system 1 can be reduced, that is, the size of the electrode production system 1 can be further reduced. Furthermore, the operation of the devices 20, 30 and 40 can be easily controlled.

Furthermore, the drying device 30 includes the emission recovery device 34 that discharges vapor emitted during the drying of the kneaded material TS, and recovers the vapor. This prevents scattering of the vapor and therefore can restrain contamination of the atmosphere around the electrode production system 1. Furthermore, the electrode production system 1 is configured so that the electrode production system 1 is able to be housed in an ordinary freight container. This makes it possible to easily transport the electrode production system 1 by truck, train, ship, or the like, from a system production factory to an electrode production factory and to immediately install the electrode production system 1 at the electrode production factory.

Furthermore, the electrode production system 1 includes the kneading device 10 to which the replaceable cartridges 3a, 3b and 3s that respectively contain the electrode materials Ta and Tb and the solvent S can be fitted. Further, the supply passage 14 for supplying the kneaded material TS is provided between the kneading device 10 and the coating device 20. This configuration eliminates the possibility that impurities, such as dust, dirt, and moisture, may be mixed into the kneaded material TS. Therefore, electrodes with high quality can be produced. Further, it is possible to continuously perform the processes from the kneading to the coating. Accordingly, unlike the conventional case, there is no need of performing the kneading in a batch process. Thus, operation can be easily performed.

The electrode production system 1 has a configuration in which the kneading device 10, the coating device 20, the drying device 30, the pressing device 40 and the supply passage 14 are entirely covered by the cover 2 and the area inside the cover 2 is cleaned and air-conditioned. Thus, it is possible to adopt the configuration in which the limited space inside the cover 2 is cleaned and air-conditioned. Therefore, the cost of the electrode production system 1 can be reduced.

Furthermore, the cover 2 is provided with the partition walls 2A, 2B and 2C that separate a portion that covers the coating device 20, the drying device 30 and the pressing device 40 and portions that cover the other devices, from each other. Due to this configuration of the cover 2, particularly the kneading device 10 is less likely to be affected by the heat generated by the drying device 30, and therefore it is possible to prevent change in the quality of the kneaded material. Furthermore, the cover 2 is provided with the cassette fitting portion 6 to which the cassette 4 containing the roll R of the wound metal foil M is replaceably fitted. This facilitates the operation of replacing the roll R of the metal foil M. Thus, the operation time can be reduced and the contamination of the metal foil M can be prevented.

Figure 5:
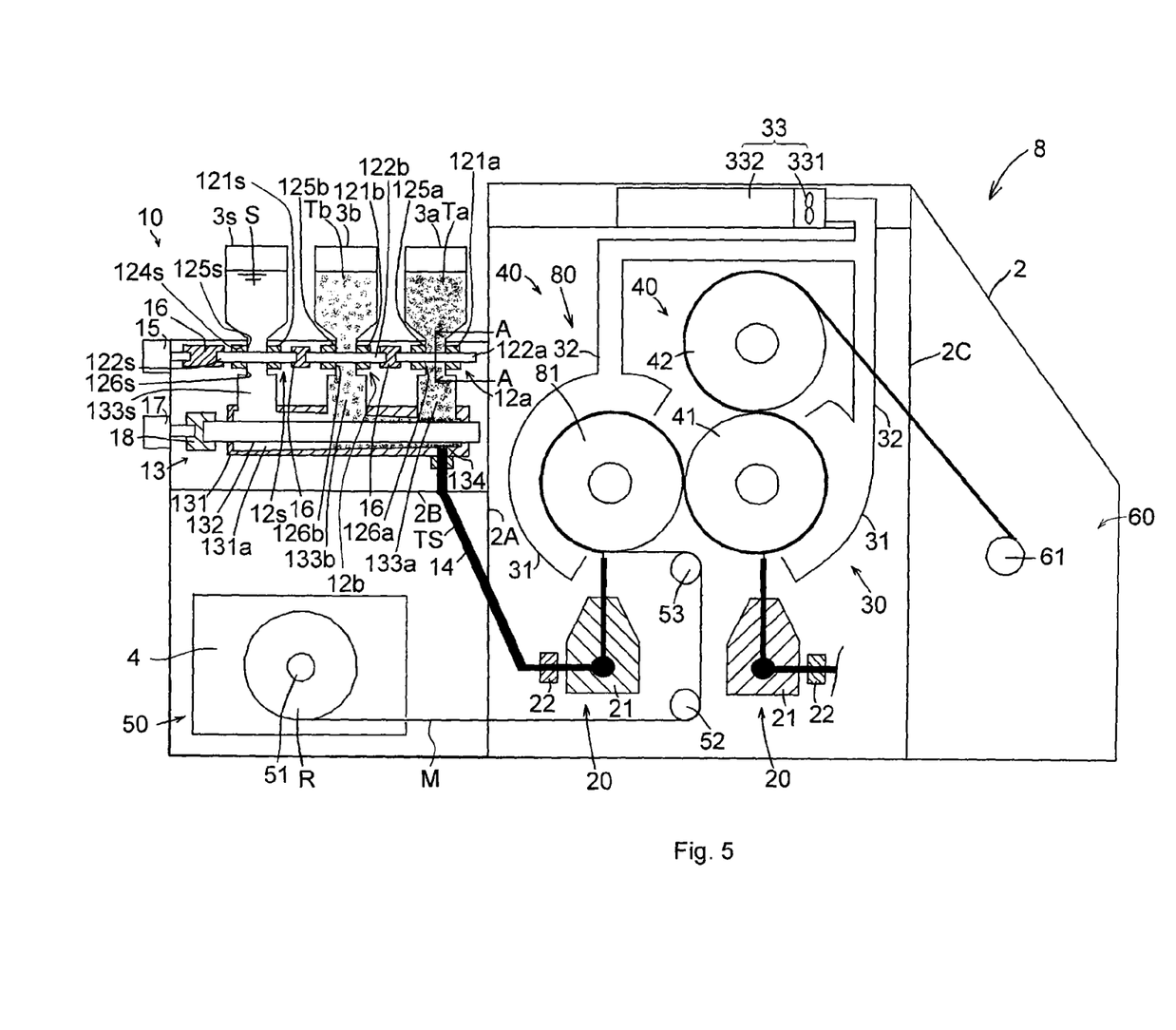
FIG. 5 is a sectional view showing an internal configuration of an electrode production system according to another embodiment.

A general configuration of an electrode production system according to another embodiment will be described. FIG. 5 is a sectional view showing a general configuration the electrode production system according to the other embodiment. The same portions and locates as those shown in FIG. 2 are denoted by the same reference characters, and detailed descriptions of those portions and locations are omitted. An electrode production system 8 shown in FIG. 5 is a system that produces an electrode, that is, a positive electrode or a negative electrode for use in a battery, by coating each of two surfaces of a metal foil M with a kneaded material TS, and drying and pressing the kneaded material TS. The electrode production system 8 includes, in addition to the component devices 10 to 60 of the electrode production system 1 shown in FIG. 2, a second coating device 20 that coats the other one of the two surfaces of the metal foil M with the kneaded material TS, and a drying device 80 that dries the kneaded material TS adhering to the other surface of the metal foil M.

The drying device 80 includes a third roller 81 on which the metal foil M with the kneaded material TS adhering thereto is wound and conveyed, a hood 31 that covers the range where the metal foil M is wound on the third roller 81, a duct 32 which communicates with the space inside the hood 31 and through which vapor of the solvent S emitted from the kneaded material TS flows, and an emission recovery device 33 that is connected to the duct 32 and that discharges and recovers the vapor of the solvent S. The drying device 80 is a device that dries the kneaded material TS adhering to the other surface of the conveyed metal foil M so that the electrode materials Ta and Tb are fixed. The third roller 81 is heated by a heat source. As the heat source, for example, an electrically-heated wire, or a pipe, through which a high-temperature liquid passes, is provided in the third roller 81.

The metal foil M conveyed from the unwinding device 50 via the conveyor rollers 52 and 53 is wound on the third roller 81, and thus the third roller 81 heats the metal foil M. Accordingly, the solvent S contained in the kneaded material TS adhering to the other surface of the metal foil M is vaporized, and thus the kneaded material TS is dried and the electrode materials Ta and Tb are fixed on the metal foil M. The third roller 81 conveys the metal foil M with the electrode materials Ta and Tb fixed thereon to the first roller 41. With the electrode production system 8 configured as described above, it is possible to achieve the same effects as described above, and to produce an electrode in which an electrode material is provided on each of the two surfaces of the metal foil M in a single production process. Thus, production efficiency can be considerably improved.

Figure 6:
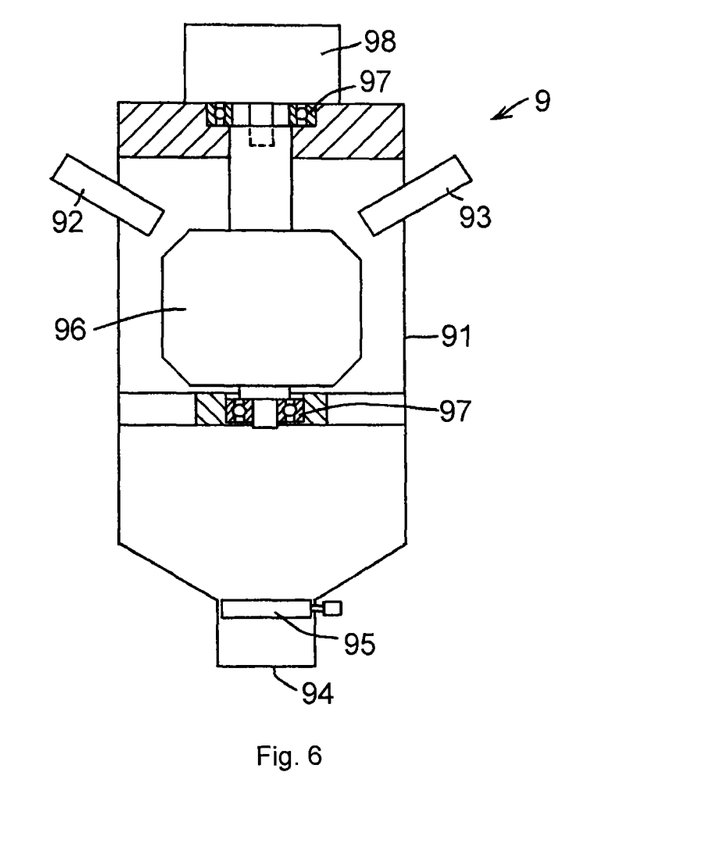
FIG. 6 is a sectional view showing another example of the cartridge.

A general configuration of another example of the cartridge will be described. FIG. 6 is a sectional view showing a general configuration of the other example of the cartridge. While the cartridges 3a, 3b shown in FIG. 3 are containers that simply store and supply the electrode materials Ta, Tb, respectively, a cartridge 9 shown in FIG. 6 is a container that stores and mixes the electrode materials Ta and Tb. In this cartridge 9, inlet openings 92 and 93 for two materials to be contained (i.e., contents) are provided in an upper portion of a main body 91 with a hollow cylindrical shape, and a discharge opening 94 for the content is provided in a lower portion of the main body 91. A valve 95 that opens and closes the discharge opening 94 is provided near the discharge opening 94.

Inside the main body 91, a stirring blade 96 is rotatably supported via bearings 97. A motor 98 that rotates the stirring blade 96 is mounted on an upper portion of the main body 91. In the cartridge 9 configured as described above, the electrode materials Ta and Tb can be introduced into the main body 91 through the inlet openings 92 and 93, and can be mixed beforehand by rotating the stirring blade 96. Therefore, the kneading of the electrode materials Ta and Tb with the solvent S can be easily and sufficiently performed. Thus, the quality of the electrode can be improved.

In the foregoing embodiments, the unwinding device 50 is disposed inside a rear lower portion of the cover 2 (a left lower portion of the cover 2 in FIG. 1A), and the winding device 60 is disposed inside a front portion of the cover 2 (a right portion of the cover 2 in FIG. 1A). However, the unwinding device 50 and the winding device 60 may be disposed side by side inside the front portion or the rear lower portion of the cover 2. With this arrangement, attachment of the roll R of the metal foil M and detachment of the roll R of the metal foil M having the electrode materials thereon can be carried out from the same direction, and therefore the operation efficiency can be improved. Furthermore, a cutter device that cuts the metal foil M having the electrode materials thereon into pieces with a predetermined length and a device that collects the cut pieces of the metal foil M may be disposed instead of the winding device 60. With this arrangement, the process of cutting the metal foil M is incorporated into the system, and thus the production efficiency can be further improved.

Furthermore, although the electrode production system 1 has the configuration in which the coating device 20, the drying device 30 and the pressing device 40 are arranged in the up-and-down direction, the configuration may be such that at least two of the devices 20, 30 and 40 are arranged in the up-and-down direction. Furthermore, although in the foregoing embodiments, the first roller 41 is used for the coating process performed by the coating device 20, the drying process performed by the drying device 30 and the pressing process performed by the pressing device 40, the configuration may be such that the first roller 41 is used for at least two of the processes performed by the devices 20, 30 and 40.

What is claimed is:

1. An electrode production system that produces an electrode of a battery, and that includes: a coating device which coats a surface of a metal foil, which is unwound from a roll of the wound metal foil and conveyed, with an electrode material containing a solvent so that the electrode material containing the solvent adheres to the surface of the metal foil; a drying device that dries the electrode material containing the solvent and adhering to the surface of the conveyed metal foil so that the electrode material is fixed to the surface of the conveyed metal foil; and a pressing device that presses the electrode material fixed to the surface of the conveyed metal foil, wherein
   the coating device, the drying device and the pressing device are provided with a plurality of rollers by which the metal foil is folded a plurality of times and conveyed,
   wherein the drying device includes at least one roller of said plurality of rollers; and
   the coating device, the drying device and the pressing device are arranged so that a coating process, a drying process and a pressing process are serially performed on the metal foil being conveyed by using the rollers,
   wherein the drying device includes one roller among the rollers, a heating device placed inside the one roller, and an exhaust device placed around the one roller, and
   wherein the drying device performs the drying process while the metal foil is in contact with the one roller.

2. The electrode production system according to claim 1, wherein at least two of the coating device, the drying device and the pressing device are relatively arranged in a vertical direction with respect to one another.

3. The electrode production system according to claim 1, wherein
   one of the rollers is used for at least two of a coating process performed by the coating device, a drying process performed by the drying device and a pressing process performed by the pressing device.

4. The electrode production system according to claim 3, wherein
   the coating device, the drying device and the pressing device are placed within or around the one of the rollers, perform the coating process, the drying process and the pressing process, respectively, while the metal foil is in contact with the one of the rollers.

5. The electrode production system according to claim 1, wherein the drying device includes an emission recovery device that discharges and recovers vapor emitted when the electrode material containing the solvent is dried.

6. The electrode production system according to claim 1, wherein the electrode production system is able to be housed in a freight container.

7. The electrode production system according to claim 1, wherein the rollers are arranged such that at least two of said rollers each folds the metal foil back by more than 90°.

8. The electrode production system according to claim 1, wherein the rollers are arranged such that at least two of said rollers each folds the metal foil back at least about 180°.

9. The electrode production system according to claim 1, wherein two of said rollers are provided in said drying device, and each folds the metal foil back by more than 90°.

10. The electrode production system according to claim 1, wherein two of said rollers are provided in said drying device, and each folds the metal foil back by at least about 180°.

* * * * *